United States Patent Office 3,558,365
Patented Jan. 26, 1971

3,558,365
METHOD OF PREPARING THIN CATALYST-SILVER ELECTRODES
Joseph C. Duddy, Trevose, Pa., assignor to
ESB Incorporated, a corporation of Delaware
No Drawing. Filed Jan. 22, 1968, Ser. No. 699,332
Int. Cl. H01m 13/08; B22f 7/00, 1/00
U.S. Cl. 136—120                               2 Claims

ABSTRACT OF THE DISCLOSURE

A thin electrode is prepared by: (a) mixing together a Raney catalyst-alloy, an oxide of silver, and a binder; (b) shaping the mixture onto a thin conductive grid; (c) reducing the oxide of silver to metallic silver; (d) dissolving the soluble metal from the Raney catalyst-alloy; and (e) burning the structure to remove the binder and to sinter the catalyst and silver together with each other and with the grid. Preferably steps (c) and (d) are combined by immersing the shaped structure in a reducing-dissolving solution such as a aqueous formaldehyde-potassium hydroxide solution. In step (e) the binder acts as the fuel for the sintering. Water and hydrogen absorbed by the structure during steps (c) and (d) function to keep the temperature of the sintering step low so that the silver particles do not coalesce, and to suppress and inhibit oxidation of the catalyst. Step (e) may be performed in open air with any convenient flame.

---

Preferably the resulting electrode is used as a fuel electrode in a fuel cell in which the fuel is dissolved in the electrolyte. Alternatively the resulting electrodes may be used as gaseous fuel or oxygen electrodes by selecting grids having internal gas ducts or by fabricating two such electrodes into a structure having internal gas ducts.

BACKGROUND OF THE INVENTION

This invention is primarily concerned with a fuel electrode for use in a fuel cell in which the fuel is dissolved in the electrolyte. The electrode has a catalyst dispersed in a silver conductive matrix, the combination being sintered to a conductive grid. Since the electrode is not intended to diffuse gaseous fuels from its interior to its exterior, when the fuel is dissolved in the electrolyte the electrode may be, and preferably is, very thin in order to obtain the highest ratio of surface area of catalyst and conductor to weight of catalyst and conductor and to enhance rapid diffusion of the dissolved fuel to reactive sites.

As is well known, the oxides of silver may be obtained in particles of much smaller size than metallic silver, meaning that the oxides of silver may be obtained which have a much higher surface area/weight ratio than metallic silver. For this reason the oxides of silver are preferable to metallic silver as starting materials in the construction of fuel electrodes but only if, during the construction process, the oxides of silver can be reduced to metallic silver without coalescing and thereby losing their advantageous high surface area/weight ratio. The problem of maintaining a high surface area/weight ratio is inherent if oxides of silver are selected as starting materials.

Assuming that the particles of silver oxide can be reduced to metallic silver without a loss in the surface area/weight ratio, the silver particles should then be made to be in intimate contact with the catalyst and with the grid on which they are deposited to assure maximum electrical conductivity in the final electrode. This can be achieved by sintering the dispersion of silver and catalyst if the sintering can be done at sufficiently low temperatures to prevent interconnecting silver particles from coalescing.

Another problem frequently encountered with sintering is that the high temperatures involved often produce serious cracking by shrinkage of the silver matrix, thus making the resultant conductor partly electrically discontinuous and increasing the internal resistance of the resulting electrode while simultaneously reducing its effective surface area and thus its catalytic activity.

SUMMARY OF THE INVENTION

The invention consists of a process consisting of the following steps: (a) mixing together a Raney catalyst-alloy, an oxide of silver, and a binder; (b) shaping the mixture onto a conductive grid; (c) reducing the oxide of silver to metallic silver; (d) dissolving the soluble metal from the Raney catalyst-alloy; and (e) burning the structure to remove the binder and to sinter the catalyst and silver together and to the grid.

Preferably steps (c) and (d) are combined by immersing the shaped structure in a reducing-dissolving solution such as an aqueous formaldehyde-potassium hydroxide solution. Here the formaldehyde reduces the particles of silver oxide to metallic silver without coalescing the resulting particles of metallic silver. Simultaneously the potassium hydroxide dissolves the soluble material such as aluminum in the Raney catalyst-alloy, leaving the catalyst remaining. The reduction of silver oxide to metallic silver and the dissolution of the soluble metal from the catalyst-alloy both involve a volumetric decrease which permits water to enter into the resulting voids by displacement. During the dissolution of the soluble material from the Raney catalyst-alloy hydrogen gas is produced, some of which is retained by adsorption in the resulting dispersed catalyst.

The binder is not needed in the final product since the silver and catalyst are fused or sintered to each other and to the grid, but the binder is useful in two respects during the construction process. First, it provides an easily workable mass in which the silver oxide and catalyst-alloy particles may be completely dispersed. Second, in the final step of the process the binder is removed by burning, in which case it functions as the fuel for the sintering of the silver and the catalyst to each other and to the grid.

The water present in the structure serves as a heat buffer to maintain low temperatures during the burning step and thereby prevents coalescence of the silver particles, while the evolution of adsorped hydrogen provides a reducing environment; the grid also serves as a heat sink which absorbs much heat and further reduces the tendency for silver particles to coalesce. The burning can be performed in an open air atmosphere without any elaborate equipment; a slow, low-temperature burning which may be obtained simply by applying a lighted match to the structure causes the catalyst and silver particles to fuse together and to the grid.

The resulting electrode retains the high surface area/weight ratio by preventing coalescence in the silver particles, is free from serious cracks in the conductive silver matrix, and can be made very thin. The process requires little capital investment for equipment, and is fast.

The resulting electrodes are particularly useful as the fuel electrodes in fuel cells having fuels dissolved in the electrolyte. One such fuel cell is described in my co-pending application, Ser. No. 441,419. However, the electrodes may also be used as gas diffusing or gas consuming electrodes in fuel cells having fuels or oxidants in the gaseous state if provision is made to permit gas ducts to reach the interior of the electrode. In this respect, an electrode having the necessary internal gas ducts could be made either by using a grid having a hollow center, or by fabricating a pair of electrodes together so that an empty space exists between them.

DESCRIPTION OF THE PREFERRED EMBODIMENT

As the first step in this process the ingredients are mixed together. They consist of a Raney catalyst-alloy, particles of an oxide of silver, and a binder. Typical of the Raney catalyst-alloys which may be used are Raney palladium and Raney platinum, with Raney palladium being preferred because it is less expensive. Raney alloys by definition have one metal (such as the catalyst in this instance) present with some other metal, which other metal will be subsequently dissolved; a common soluble metal in Raney alloys in aluminum, which is readily dissolved in alkaline solutions. The oxide of silver may be $Ag_2O$ or the higher oxide, AgO. The binder may be selected from any number of materials, for it is a temporary constituent to be subsequently removed by burning; such materials as polyethylenes, polyisobutylenes, and low temperature softening olefins in general may be used as the binder. The proportions of Raney catalyst-alloy, silver oxide particles, and binder may vary within wide ranges, with no particular ranges being essential limitations on this process.

As the second step, the mixture is shaped onto a conductive grid. This shaping may if desired be performed in two parts, first by sheeting and then by pressing the sheet onto a grid, or the shaping may be done in one operation. Care must be exercised to avoid undue decomposition of the oxide of silver during this shaping step (basically a temperature problem) nor to damage the grid (basically a pressure problem). The grid may be selected from many commercially available materials, but is preferably very thin; such materials as silver, nickel, silver plated copper, gold plated nickel, and others may be used as the grid.

The next two steps in the process, reducing the oxide of silver to metallic silver and dissolving the soluble metal from the Raney catalyst-alloy, are preferably combined, although they may be performed separately. The structure comprising the mixture of a Raney catalyst-alloy, particles of an oxide of silver, and a binder shaped onto a conductive grid is immersed into a solution which simultaneously reduces the oxide of silver to metallic silver and also dissolves the soluble metal from the Raney catalyst-alloy. Thus the two components of the solution, the reducing agent and the solvent, must be compatible with each other. A good reducing agent for the silver oxide is formaldehyde, while an aqueous potassium hydroxide solution is satisfactory for dissolving aluminum from the Raney catalyst-alloy; formaldehyde and potassium hydroxide are compatible with each other. The proportions of reducing agent to solvent may vary considerably, and ranges of proportions are not to be considered as essential limitations of this process where the reducing and dissolving steps are combined. It should be pointed out here that it is believed that two other events occur during the reduction and dissolution which are useful later in the process in controlling the sintering at low temperatures. First, the reduction of a silver oxide molecule to metallic silver results in a volumetric decrease which would permit small amounts of water to enter and be retained in the resulting spaces. Second, hydrogen gas is produced when the aluminum is being dissolved from the Raney catalyst-alloy by the potassium hydroxide, and some of this hydrogen gas may be retained by adsorption in the catalyst metals. After the reducing-dissolving steps the structure may be washed briefly in a rinse water if desired.

In the final step the structure is burned to remove the binder and to sinter the catalyst and metallic silver particles together with each other and with the grid. During the burning the binder functions as the fuel for the sintering. The binder may be burned in an open-air atmosphere and may be ignited simply by the application of a lighted match; if excess surface water exists on the structure before ignition, it may be easily removed by blotting or circulating air. The water and hydrogen gas retained in the interior of the structure control the rate of burning, thus preventing the silver particles from coalescing and preventing the resulting silver matrix from developing cracks; also contributing in this effort is the conductive grid, which acts as a heat sink to absorb and transfer to the surroundings much of the heat which is generated by this burning.

A single example will serve to illustrate the process of this invention. First, the ingredients were mixed together, consisting of 41.7 parts Raney palladium-alloy (containing 45% palladium and 55% aluminum), 212.5 parts $Ag_2O$, and 12.5 parts polyethylene binder, the parts being by weight. Second, the mixture was shaped onto a conductive grid. The mixture was sheeted to a thickness of 3 mils (0.003″) and then applied to an expanded silver fine mesh structure, a grid of 5 mils (0.005″) thickness; the mixture was applied to the grid at 230° F. and 1800 p.s.i. Third, the resulting plate was immersed for one hour in alkaline formaldehyde (230 parts by volume 27% KOH, 39 parts formaldehyde) and then washed in deionized water. Finally, after the surface water was removed from the wet plate by blotting, a flame was momentarily applied to one corner of the plate to initiate ignition. The binder was burned out at the controlled rate of about 10 inches per minute. Optical pyrometry established a maximum structure temperature of 420° C.

The resulting product was extremely handleable and was ready for use without further processing. The electrode contained about 0.18 gram Ag and 0.017 gram Pd per square inch. The electrode was 0.008 inch thick. The electrode showed few and only small cracks when examined under magnification. The entire process is fast, with the electrode produced by the example above being ready for installation into a fuel cell within two hours after the ingredients were mixed together.

1. A method of preparing thin catalyst-silver electrodes comprising:
   (a) mixing together a Raney catalyst-alloy, an oxide of silver, and a binder;
   (b) shaping the mixture onto a conductive grid;
   (c) reducing the oxide of silver to metallic silver;
   (d) dissolving the soluble metal from the Raney catalyst-alloy; and
   (e) burning the structure to remove the binder and to sinter the catalyst and silver together with each other and with the grid.

2. The method of claim 1 in which steps (c) and (d) are combined by immersing the structure in a solution which reduces the oxides of silver and dissolves the soluble metal from the Raney catalyst-alloy.

No references cited.

WINSTON A. DOUGLAS, Primary Examiner.

M. J. ANDREWS, Assistant Examiner

U.S. Cl. X.R.

75—208, 211, 222